United States Patent [19]

Johnson

[11] Patent Number: 5,323,525
[45] Date of Patent: Jun. 28, 1994

[54] CUTTER HEAD FOR PALLET DISMANTLING MACHINE

[76] Inventor: John L. Johnson, 934 NE. 77th Ave., Portland, Oreg. 97213

[21] Appl. No.: 62,583

[22] Filed: May 17, 1993

Related U.S. Application Data

[63] Continuation of Ser. No. 792,701, Nov. 15, 1991, Pat. No. 5,211,094.

[51] Int. Cl.⁵ ............................................. B23P 19/04
[52] U.S. Cl. ...................................... 29/426.4; 29/239; 83/507; 83/943
[58] Field of Search ................ 29/239, 426.4, 564.3; 83/51, 943, 503, 507, 443

[56] References Cited

U.S. PATENT DOCUMENTS

| | | | |
|---|---|---|---|
| 2,307,452 | 1/1943 | Cohen | 83/503 X |
| 2,970,622 | 2/1961 | Lundell | 83/676 X |
| 3,545,326 | 12/1970 | Madachy | 83/503 X |
| 3,786,706 | 1/1974 | Hyatt et al. | 83/503 X |
| 3,869,780 | 3/1975 | Ginnow et al. | 29/200 |
| 3,905,262 | 9/1975 | Stromberg | 83/503 X |
| 4,320,570 | 3/1982 | Williams | 29/564.3 |
| 4,330,092 | 5/1982 | Roman | 83/503 X |
| 4,346,506 | 8/1982 | Martindale | 83/943 X |
| 4,586,235 | 5/1986 | Benvenuto | 83/943 X |
| 4,750,255 | 6/1988 | Hufnagel | 83/743 X |
| 4,945,626 | 8/1990 | Dystra et al. | 83/943 X |
| 5,211,094 | 5/1993 | Johnson | 83/943 |

Primary Examiner—Richard K. Seidel
Assistant Examiner—Kenneth E. Peterson
Attorney, Agent, or Firm—Eugene M. Eckelman

[57] ABSTRACT

A base mount supports a secondary mount in surface facing relation and a pair of these mount assemblies are positioned in spaced relation to receive a pallet stringer between them. The mounts support circular cutter discs which are disposed in axially aligned pairs and also in laterally aligned pairs whereby to be capable of severing nails on opposite edges of a stringer in a single pass of a stringer through the space between the laterally spaced mounts. The base mounts support the secondary mounts and are capable of being retrofitted to existing machines. The base and secondary mounts are secured by cross plates that have a cutting edge to form a backup cutter for the cutter discs. The secondary mounts are hingedly supported on the base mounts by a cross hinge at the rear of the mounts and a spring and limit assembly is provided between the mounts to allow adjustment of the mounts for different dimensioned stringers. The cutter discs are supported on the mounts by bearings that provide lateral adjustment of the cutter discs. The bearings are compact in their structure and compactly positioned in the mounts for ruggedness and long life.

5 Claims, 3 Drawing Sheets

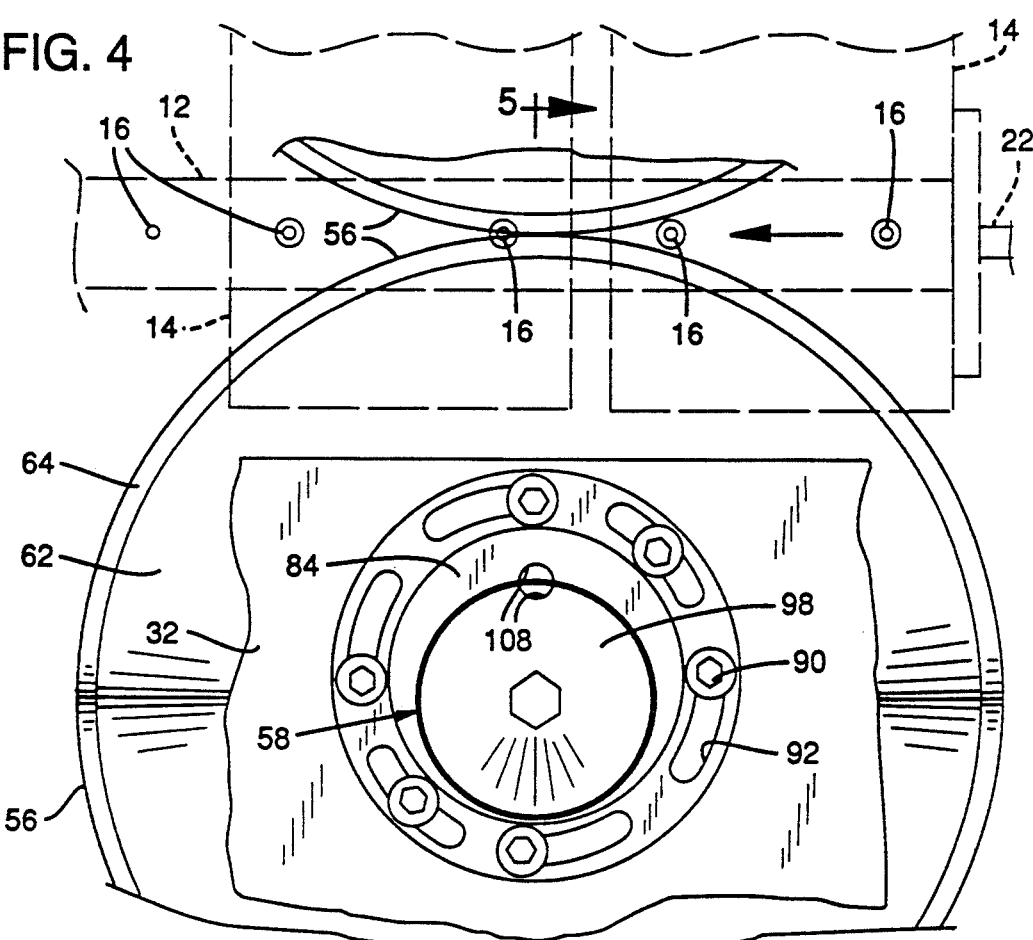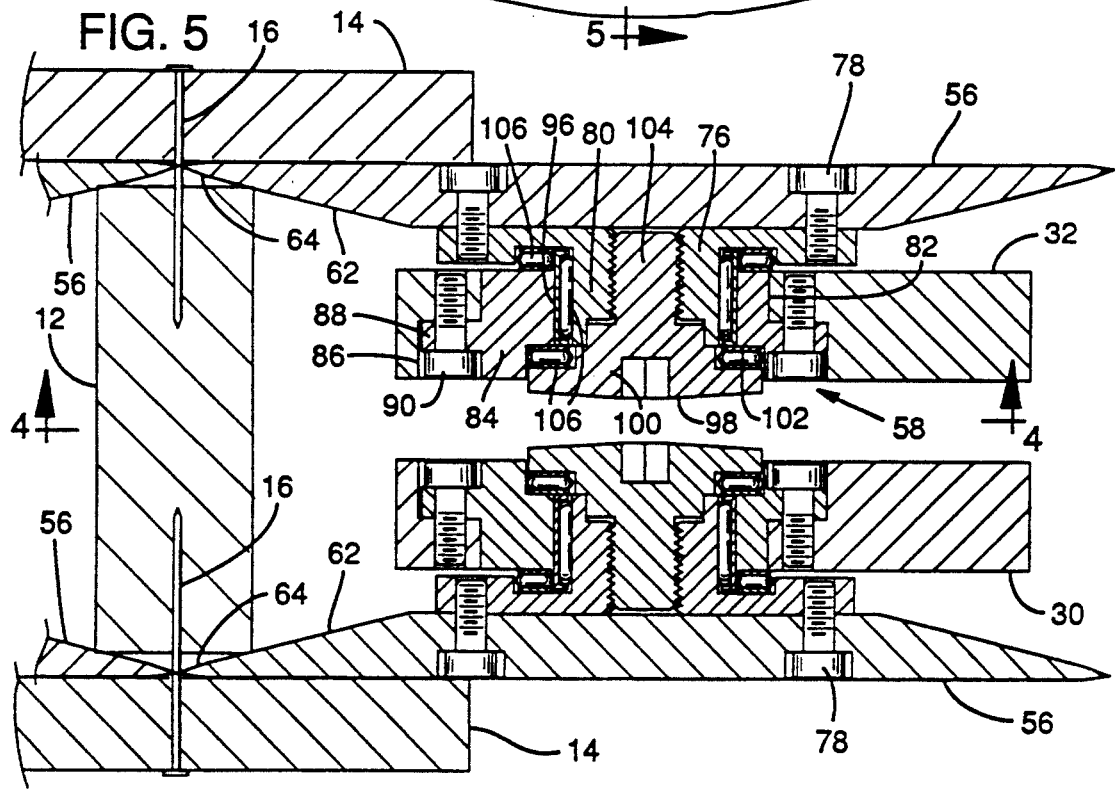

CUTTER HEAD FOR PALLET DISMANTLING MACHINE

This is a continuation of application Ser. No. 07/792,701, filed Nov. 15, 1991, now U.S. Pat. No. 5,211,094.

BACKGROUND OF THE INVENTION

This invention relates to new and useful improvements in a cutter head for pallet dismantling machines.

Wooden pallets are extensively used for stacking products to be transported or stored. Since considerable lumber is used in the construction of the pallets, damaged pallets frequently are repaired rather than discarded. Power devices have heretofore been patented for dismantling the pallets. One such device is shown in U.S. Pat. No. 3,869,780. In order for a pallet dismantling machine to be economically feasible, it must operate with such efficiency as to make its use a substantial improvement over hand dismantling or repair. This efficiency must be adequate to the extent that whole or partial dismantling of the pallet is a speedy and low effort operation. Also pallet dismantling machines must be rugged and reliable in use whereby to be substantially free of down time due to repair or maintenance.

It is considered that prior dismantling machines are deficient primarily because of the structure of the cutter head. That is, the prior cutter heads have a structure that may cause damage to the pallet stringers or deck boards, or the cutter head itself, due to the lack of confining movement of the stringer through the head. Furthermore, it is desired that the cutting head of pallet dismantlers have a structure that makes it versatile in its mounted use on different dismantling machines, namely, a structure that will allow the cutter head to be retrofitted to existing machines Prior devices do not have this feature.

SUMMARY OF THE INVENTION

According to the present invention and forming a primary objective thereof, a cutter head for a pallet dismantling machine is provided that possesses substantial improvements over known types of cutter heads.

More particularly, it is an object of the invention to provide a cutter head for a pallet dismantling machine that has a general structural arrangement that dismantles pallets without damaging the pallet stringers and without damaging the cutter head, and further that allows the cutter head to be retrofitted to other existing pallet dismantling machines.

A further object is to provide a cutter head for pallet dismantling machines that has double assemblies of circular cutting discs wherein the nails of both edges of a stringer are simultaneously cut, thus fully dismantling a stringer of a pallet in one pass of the stringer through the cutter head.

Another object of the invention is to provide a cutter head of a structure that prevents a dismantled stringer from moving back through the head in a return movement of a pallet pusher, thus allowing dismantled stringers to discharge previously dismantled stringers from the machine.

Also it is an object of the invention to provide a cutter head for a pallet dismantling machine that has a compact bearing and shaft assembly for the cutter discs whereby to be rugged and reliable in operation.

A further object is to provide a cutter head for a pallet dismantling machine having opposed cutter disc support mounts that are hingedly adjustable relative to each other for accommodating a small variance in thickness of pallet stringers, said mounts also having limit means for limiting the hinged movement thereof whereby to maintain an accurate path through the head.

The invention comprises first and second support means including a base portion and a secondary portion disposed in spaced relation. These pairs of support means are disposed in laterally spaced relation to form a space for a pallet stringer to be moved therethrough in a dismantling operation. Free running circular cutter discs are supported on the support means and are disposed in axially aligned pairs and also in laterally aligned pairs whereby to be capable of severing nails on opposite edges of a stringer in a single forced pass of a stringer through the space between the laterally spaced support means. The secondary portions are hingedly supported on the base portions to allow adjusted spacing of the aligned pairs of cutter discs. The base portion has means providing convenient retrofit engagement with existing dismantling machines. Cross plate cutter means are secured in place behind the cutter discs and serve as backup cutters for the cutter discs. The first and second support means include compact bearing and shaft assemblies providing a rugged and reliable structure.

The invention will be better understood and additional objects and advantages will become apparent from the following description taken in connection with the accompanying drawings.

BRIEF DESCRIPTION OF THE DRAWINGS

FIG. 4 is a fragmentary plan view taken on the line 4—4 of FIG. 5, and

FIG. 5 is a sectional view taken on the line 5—5 of FIG. 4.

DETAILED DESCRIPTION OF A PREFERRED EMBODIMENT

Figure 1:
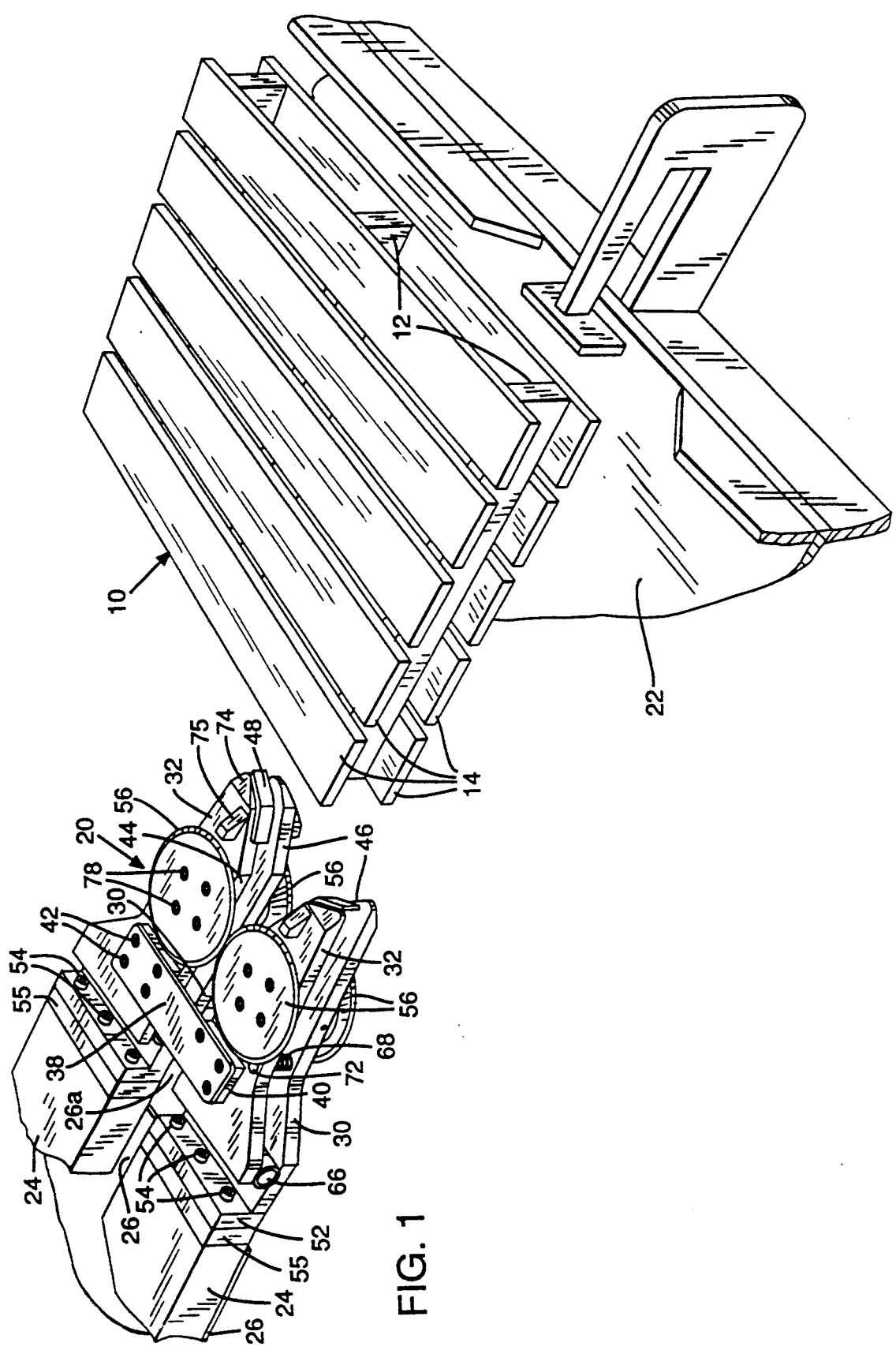
FIG. 1 is a perspective view of the present cutter head as mounted on a pallet dismantling machine, the machine itself being only partially shown.
Figure 2:
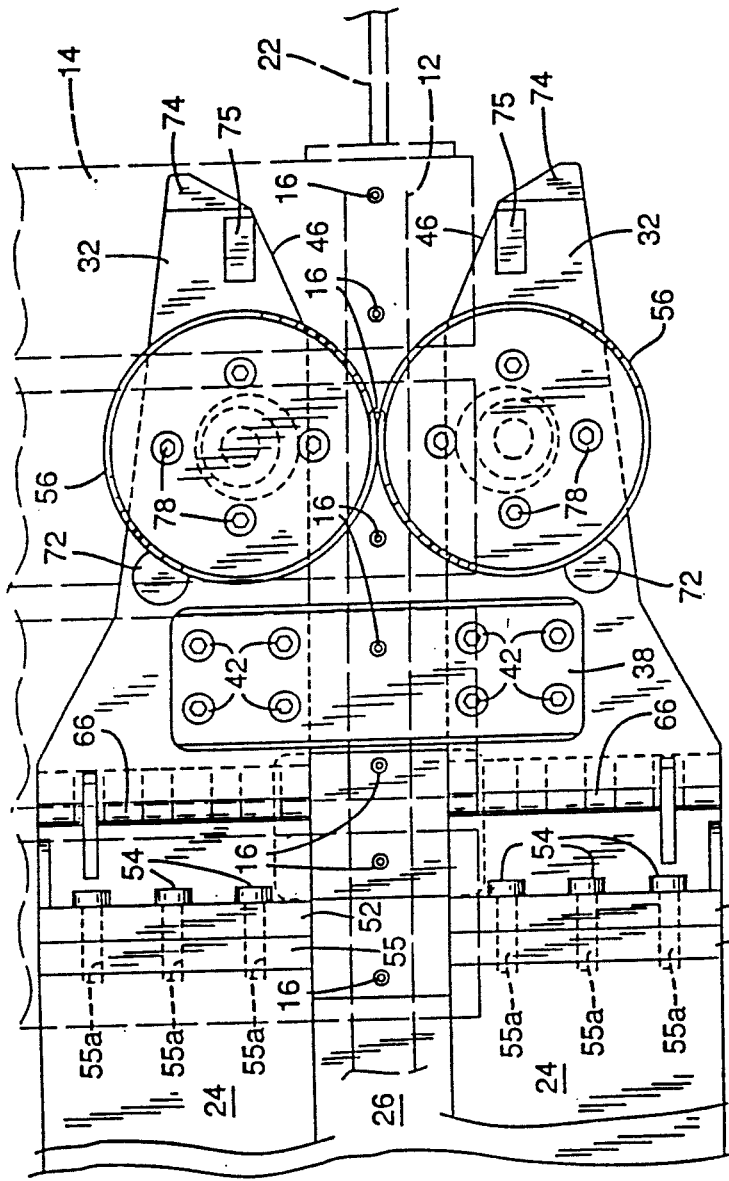
FIG. 2 is a top plan view of the present cutter head, pallet portions moving through the head being shown in broken lines.

With particular reference to the drawings and first to FIG. 1, the invention is concerned with the function of dismantling conventional wooden pallets 10 having elongated stringers 12, usually three but occasionally more or less, and a suitable number of top and bottom deck boards 14 across the stringers. These deck boards are fastened to the stringers by nails 16, FIG. 5. The cutter head of the invention is designated generally by the numeral 20 and is shown in diagrammatic relation in FIG. 1 with a powered pusher mechanism 22 which is conventional in its structure and operation in that it drives a table, not shown, that carries a pallet through the cutter head to cut the nails that connect the stringers 12 to the deck boards 14. This type of machine also has drive means for returning a partially dismantled pallet. The machine further includes a pair of suspension arms 24 suitably cantilevered on a machine frame in a conventional manner so that when a pallet is pushed through the head along a supporting table surface in a dismantling operation, the stringer slides along the bottom wall of a chute 26 between the suspension arms. The deck boards slide above and below the suspension arms in this nail cutting step.

The cutter head of the instant invention comprises two pairs of cutter assemblies, each comprising first and second mounts 30 and 32, respectively. Mounts 30 are secured integrally together in side by side relation by two cross bridge plates 36 and mounts 32 are secured integrally together in the same manner by a cross bridge plate 38. Each of the plates 36 and 38 is raised from its respective support surface on the mount by flat blocks or spacers 40 and is secured, together with the spacer blocks, to its two side by side mounts by fasteners 42, such as bolts. The inwardly facing edges 44 of all four mounts 30 and 32 are disposed in spaced parallel relation, the space 26a between them being identical to the width of the chute 26 between the suspension arms 24 and in alignment therewith to feed stringers into the cute. A front end portion of edges 44 has outwardly widening tapers 46 to center a misaligned stringer into the space 26a through the head. Some of these tapered edges preferably have renewable plates 48 thereon with an overbite to prevent entry between the pair of leading edges of each mount.

Mounts 30 project a short distance to the rear of mounts 32. This rearward end of the mounts 30 comprises a base end with an integral angular flange 52 by means of which the head is adapted to be secured, as by bolts 54, to adapter plates 55 welded to the end of arms 24 and having threaded bores 55a to receive the bolts.

Figure 3:
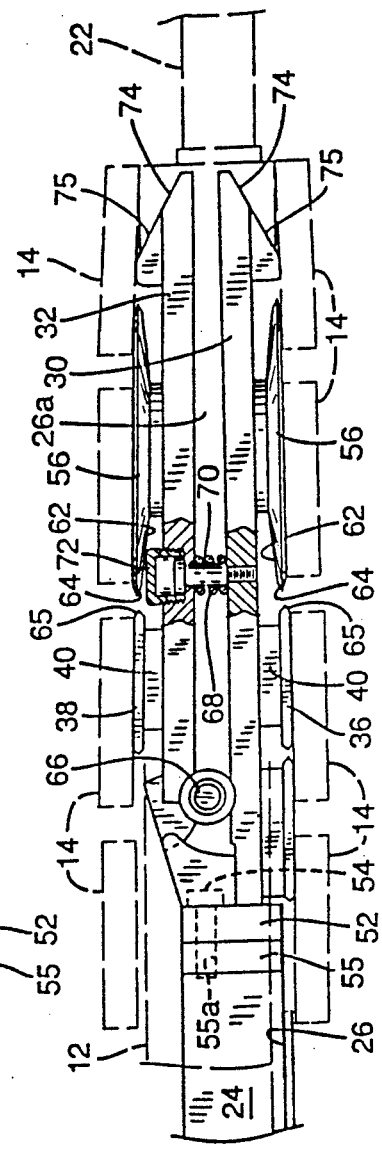
FIG. 3 is a side edge view of the cutter head, pallet portions also being shown in broken lines.

Each mount at its forward portion supports a cutter disc 56 at its outer surface by a journal bearing assembly 58, FIGS. 4 and 5, to be described, that allows free turning movement of the discs. The discs are supported selectively by the journal bearing assemblies such that they precisely meet or overlap at cutting edge bevels in the center and thus are capable of completely severing nails that move through the space 26a. With particular reference to FIGS. 3 and 5, cutter discs 56 have a double taper, namely, a gradual or long taper 62 on the inner facing surfaces thereof and a more blunt or short taper 64 at the outer surface, the central portion of the discs between the tapers 62 having a uniform thickness. In such arrangement, a rugged and durable cutting edge is provided. Also, with the outer flat surface of the discs slidably engaging the inner surface of the deck boards as the disc is being forced between the stringer and deck board, the nails will be severed close to the deck board. Cross plates 36 and 38 are supported in the same plane as the cutter discs and have a front edge 65 to assist in the cutting of any nails that the cutter discs fail to sever completely due to misadjustment.

The edge dimension or height of stringers may vary somewhat and for this purpose mounts 32 have a cross hinge support connection 66 at their rearward ends to their respective mounts 30. Thus the mounts 32 can pivot relative to the mounts 30 if necessary. More particularly, the mounts 30 and 32 in the pairs are maintained in spaced relation by compression springs 68 disposed in engagement against facing surfaces of the mounts and mounted on bolts 70 connected between the two mounts. Bolts 70 have a threaded connection with mounts 30 but have slidable movement through the mounts 32 to allow the mounts 32 to pivot toward its associated mount 30. Bolts 70 are of selected length to limit outward spreading movement of the mounts under the action of the springs, the spread of the pairs of mounts being set by the bolts 70 to accommodate a maximum edge dimension of stringers to be dismantled. The heads of bolts 70 are recessed in the mounts 32 and are enclosed in caps 72 threadedly secured to the recess. The caps are of a height dimension that allows the mounts to work in their spring compression movements and serve to seal the recesses against particles or chips that might interfere with the operation of the bolts. The two sets of mounts 30 and 32 are set for maximum edge stringer dimension and if a pallet with a smaller stringer than the setting of the head is engaged, the springs 68 allow the mounts to compress to or nearer the proper dimension of the stringer. The mounts are compressed by engagement of the tip ends thereof with the inner or facing surfaces of the deck boards of the pallet, and to provide this inserting engagement, the ends of the mounts have bevelled tips 74 and tapered ramp blocks 75, the top of the taper of said blocks being in the same plane as the cutting edge of the cutter discs, whereby these inclined surfaces properly position the deck boards for movement of the stringer through the head.

With particular reference to FIGS. 4 and 5, the journal bearings 58 for the cutter each comprises an inner race member 76 secured to the inner surface of a cutter disc 56 in concentric relation by a series of cap screws 78. This inner race has a hub portion 80 projecting freely into a bore 82 in the mount. An outer race 84 is set in a recess 86 on the inner surface of the mount of the cutter head and has an outer flange 88 secured to the mount by a series of cap screws 90 extending through arcuate slots 92 in the flange. Outer race 84 has a central bore 96 that receives the hub portion 80 of the inner race 76 in a shaft type support, and the outer race is connected for free rotation to the inner race by an end cap 98 having a head portion 100 countersunk in a recess 102 in the outer race and having right hand and/or left hand threaded shanks 104, for clockwise and counterclockwise motion, threadedly secured in the hub portion of the first race. Bearings 106, such as needle bearings, are contained between running surfaces of the two races.

It is desired that the cutting discs have relative lateral adjustment so that the cutting edge points thereof can be adjusted due to wear or other purposes. To achieve such adjustment, outer race 84 comprises an eccentric and the axis of the cutter discs can be shifted laterally by providing a rotatable adjustment between this outer race and the bore 82 in the mount. This is accomplished by loosening the cap screws 90 so that this relative adjustment can be made. In order for such adjustment to be made, it is only necessary to lock the inner and outer races together and turn the whole assembly a selected amount to reposition the eccentric outer surface of the outer race in the bore 82 of the mount. After suitable adjustment, the cap screws 90 are tightened. Notches 108 are provided in each of the cap and outer race for receiving a pin or the like temporarily therebetween to hold these two members stationary while adjusting the assembly in the bore 82.

With particular reference to FIG. 5, it will be seen that the bearing assemblies are compact in structure whereby to be substantially concealed and also to be of minimum height and thus rugged and strong. These features are accomplished by the recessed mounting 86 of the outer race 84 in the mount, the recessed mounting 102 of the cap 98 in the outer race, and the minimal but heavy duty thickness of the bearing races 76 and 84.

The bearings 106 are arranged between the two races to bear thrust and side load forces.

In operation, the cutter discs are first adjusted laterally so as to be in precise edge on edge relation as shown in FIGS. 4 and 5. This is accomplished by loosening cap 98, loosening cap screws 90, temporarily locking the two races 76 and 84 together by first rotating the two races relative to each other to align the notches 108 with each other, inserting a pin in these aligned notches, and then rotating the entire wheel and bearing assembly in the bore 82 in the mount 30 or 32 so that the eccentric outer race will adjust the wheel assembly to the desired lateral position. When the desired lateral position of the wheel is reached the cap 98 and cap screws 90 are retightened.

To dismantle a pallet, one stringer thereof at a time is forced longitudinally into the cutter head as by a pusher mechanism 22. The leading end of the stringer is automatically aligned laterally of the cutter head by the tapered front edges 46 of the cutter head mounts and the ramps 75 provide a guided lift of the stringer into the head and proper spacing of the mounts 30 and 32 in each pair against the spring action 68. The table surface or suspension arms 24 may be adjustable relative to the table surface if desired, as known in the art. As the pallet advances relative to the cutter head, the nails are severed for both top and bottom deck boards and the stringer moves into chute 26. The pallet is returned and the process repeated for each stringer, each stringer pushing the previously removed stringer along the chute to be discharged. With the double cutter disc arrangement on each mount assembly 30 and 32, a stringer requires only a single stroke through the head to separate all opposing deck boards from this stringer and it never has to be returned with the pallet drive mechanism. In the event the cutter wheels fail to fully cut a nail due to poor adjustment, the sharpened cross plates 36 complete the cut.

The present invention thus has the advantage that it will cut nails on both sides of the stringer simultaneously to greatly reduce the dismantling time. The compactness of the cutter head and particularly the structure of the bearing assemblies makes for a rugged substantially damage free and long life cutter head. The hinged connection of the mounts 32 provides some adjustment of its head for stringer edge dimension and the limiting means 70 of this resiliency prevents damage to the head or pallet. The integrated construction of the head by means of the base end 52 and the cross plates 36 makes the cutter head readily adaptable to being retrofitted to existing pallet dismantling machines with minor alteration of the machines. Also, the present cutter head by its structure causes automatic ejection of the dismantled stringers because when a pusher mechanism returns the pallet after completion of a stringer dismantling stroke, the stringer that has just been dismantled will not return with the pallet because it has projecting cut nail ends that hang up on cross plates 36 and 38. This removed stringer will thus remain in its rearward position and as stated be ejected through the chute 26 by the following stringer Also, it is within the concept of the invention to use the present cutter head as a single cutter head, namely, to cut the nails on one side only and thus requiring two passes of the stringer through the head. This is accomplished by removing the cutter blades 56 that are supported on the mounts 32. The stringer will thus remain intact on this one side and will have to be returned and inverted before again being run through the head.

Although a single cutter head is shown and described herein, it is to be understood that these heads may be mounted in tandem whereby to remove all the stringers with one pass of the pallet through the machine.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A cutter head for a machine for dismantling pallets of the type having longitudinal stringers with top and bottom edges and cross deck boards nailed to at least one edge of the stringers, said cutter head comprising:

a pair of support means each having forward and rearward ends, side edges, and top and bottom surfaces, said pair of support means being disposed in selected laterally spaced fixed relation and with side edges thereof forming a space for a pallet stringer to be moved therethrough in a dismantling operation;

a freely rotating cutter disc on each of said support means having outer cutting edges and a uniform thickness central body portion having flat opposite defining surfaces; and bearing means attached to said cutter discs supporting said cutter discs on respective support means in laterally positioned relation parallel with and closely adjacent to said support means for severing nails of a stringer passed between the support means, said bearing means each including an outer race having recessed eccentric mounting in one of said bottom and top facing surfaces of said support means, means securing said outer race to said support means, an inner race secured flatwise to a flat body surface of said cutter disc, recess means in said outer race receiving said inner race in journaled relation, eccentric adjustment means between said outer race and said support means, mans connecting said inner race to said outer race in assembled relation, and means releasably securing said outer race to said support means to provide, upon release of said outer race, lateral repositioning of said cutter discs relative to their support means to compensate for wear of said outer cutting edges, said recessed mounting of said outer race in the respective support means and the recessing of the inner races in said outer races providing a compact and rugged substantially concealed bearing structure while maintaining a full body thickness for said cutter discs.

2. A cutter head for a machine for dismantling pallets of the type having longitudinal stringers with top and bottom edges and cross deck boards nailed to at least one edge of the stringers, said cutter head comprising:

first and second pairs of cooperating top and bottom support means, each of said support means having forward and rearward ends, side edges, and top and bottom surfaces with the bottom surface of one of said support means in said pairs facing the top surface of the other support means in said pairs in spaced relation, said pairs of support means being disposed in selected laterally spaced fixed relation and with side edges thereof forming a space for a pallet stringer to be moved therethrough in a dismantling operation;

top and bottom freely rotating cutter discs on each of said support means having outer cutting edges capable of movement along respective top and bottom edges of a stringers, and bearing means attached to said cutter discs supporting said cutter discs on respective support means in laterally positioned relation parallel with and closely adjacent to said support means for severing nails of a stringer passed between the support means, said bearing means each including an outer race having recessed eccentric mounting in said bottom and top facing surfaces of said support means, means securing said outer race to said support means, an inner race secured flatwise to a flat body surface of said cutter disc, recess means in said outer race receiving said inner race in journaled relation, eccentric adjustment means between said outer race and said support means, means connecting said inner race to said outer race in assembled relation, and means releasably securing said outer race to said support means to provide, upon release of said outer race, lateral repositioning of said cutter discs relative to their support means to compensate for wear of said outer cutting edges, said recessed mounting of said outer race in the respective support means and the recessing of the inner races in said outer races providing a compact and rugged substantially concealed bearing structure while maintaining a full body thickness for said cuter discs and for conserving sufficient space between said upper and lower support means to provide room for spacing of said cutter discs for movement along respective top and bottom edges of the pallet stringers in a cutting operation.

3. The cutter head of claim 2 wherein said means securing said outer race to said support means comprise arcuate slots in one of said outer race and support means and clamp screws in the other of said outer race and support means having releasable clamping engagement in said slots.

4. The cutter head of claim 2 wherein said bearing means include needle bearings between said inner and outer races in an arrangement to withstand thrust and side loads.

5. A cutter head for a machine for dismantling pallets of the type having longitudinal stringers with top and bottom edges and cross deck boards nailed to at least one edge of the stringers, said cutter head comprising:

a pair of stationary bottom support means having forward and rearward ends, side edges, and top and bottom surfaces, said support means being connected laterally by bottom bridge plate means extending across the bottom surface thereof, a pair of top support means having forward and rearward ends, side edges, and top and bottom surfaces, said top support means being connected laterally by top bridge plate means extending across the top surface thereof vertically above the bottom bridge plate means, and pair of top support means being disposed above respective bottom support means, lateral axis hinge means securing said pair of top support means in supported rotation on said bottom support means, said pairs of support means being disposed in selected laterally spaced fixed relation by said bridge plate means and with side edges thereof forming a space for a pallet stringer to be moved therethrough in a dismantling operation;

top and bottom, freely rotating cutter discs on each of said support means having outer cutting edges capable of movement along respective top and bottom edges of a stringer, said bridge plate means being disposed forwardly of said hinge means and rearwardly of said cutter discs in a closely spaced relation from each of said hinge means and cutter discs which is substantially less than the overall length of said support means, and bearing means attached to said cutter discs supporting said cutter discs on respective support means in laterally positioned relation parallel with and closely adjacent to said support means for severing nails of a stringer passed between the support means, said bearing means each including an outer race having recessed eccentric mounting in said bottom and top facing surfaces of said support means, means securing said outer race to said support means, an inner race secured flatwise to a flat body surface of said cutter disc, recess means in said outer race receiving said inner race in journaled relation, eccentric adjustment means between said outer race and said support means, means connecting said inner race to said outer race in assembled relation, and means releasably securing said outer race to said support means to provide, upon release of said outer race, lateral repositioning of said cutter discs relative to their support means to compensate for wear of said outer cutting edges, said recessed mounting of said outer race in the respective support means and the recessing of the inner races in said outer races providing a compact and rugged substantially concealed bearing structure while maintaining a full body thickness for said cutter discs and for conserving sufficient space between said upper and lower support means to provide room for spacing of said cutter discs for movement along respective top and bottom edges of the pallet stringers in a cutting operation.

* * * * *